US011139715B2

(12) United States Patent
Onishi et al.

(10) Patent No.: US 11,139,715 B2
(45) Date of Patent: Oct. 5, 2021

(54) ROTARY ELECTRIC MACHINE AND MANUFACTURING METHOD THEREFOR

(71) Applicant: Mitsubishi Electric Corporation, Tokyo (JP)

(72) Inventors: Yoshihiko Onishi, Tokyo (JP); Tetsuya Iwata, Tokyo (JP); Koji Tamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 89 days.

(21) Appl. No.: 16/342,076

(22) PCT Filed: Nov. 2, 2016

(86) PCT No.: PCT/JP2016/082585
§ 371 (c)(1),
(2) Date: Apr. 15, 2019

(87) PCT Pub. No.: WO2018/083754
PCT Pub. Date: May 11, 2018

(65) Prior Publication Data
US 2019/0252941 A1 Aug. 15, 2019

(51) Int. Cl.
*H02K 5/24* (2006.01)
*H02K 1/14* (2006.01)
(Continued)

(52) U.S. Cl.
CPC .............. *H02K 5/24* (2013.01); *H02K 1/146* (2013.01); *H02K 1/18* (2013.01); *H02K 1/185* (2013.01);
(Continued)

(58) Field of Classification Search
CPC .. H02K 5/24; H02K 5/04; H02K 5/20; H02K 1/146; H02K 1/18; H02K 1/185;
(Continued)

(56) References Cited

U.S. PATENT DOCUMENTS

2007/0278979 A1* 12/2007 Hashimoto ............ H02K 15/16
318/538
2008/0258668 A1* 10/2008 Oguri ..................... H02K 15/16
318/538
(Continued)

FOREIGN PATENT DOCUMENTS

JP 07-177697 A 7/1995
JP 2008-22592 A 1/2008
(Continued)

OTHER PUBLICATIONS

Machine translation of JP-2016012995-A. (Year: 2016).*
(Continued)

*Primary Examiner* — Michael Andrews
(74) *Attorney, Agent, or Firm* — Sughrue Mion, PLLC; Richard C. Turner

(57) ABSTRACT

A rotary electric machine includes: a floored cylindrical case in which an opening at a first end of a cylindrical portion is closed by a floor portion; a stator that includes: an annular stator core that is held inside the case by being fitted together with and fixed to the cylindrical portion; and coils that are mounted to the stator core; a frame that closes an opening at a second end of the cylindrical portion; and a rotor that is fixed to a rotating shaft, and that is disposed on an inner circumferential side of the stator, wherein: a first stress relieving indented portion is formed around an entire circumference at a first end of an inner circumferential surface of the cylindrical portion such that a gap is formed between a first end portion of an outer circumferential surface of the stator core and the cylindrical portion.

13 Claims, 5 Drawing Sheets

(51) Int. Cl.
*H02K 9/22* (2006.01)
*H02K 3/32* (2006.01)
*H02K 1/18* (2006.01)
*H02K 5/04* (2006.01)
*H02K 15/14* (2006.01)

(52) U.S. Cl.
CPC ............... *H02K 3/325* (2013.01); *H02K 5/04* (2013.01); *H02K 9/22* (2013.01); *H02K 15/14* (2013.01); *H02K 2203/12* (2013.01)

(58) Field of Classification Search
CPC ...... H02K 2205/09; H02K 9/22; H02K 3/325; H02K 2203/12; H02K 15/14; H02K 15/02
USPC ........................................ 310/51, 418, 254.1
See application file for complete search history.

(56) References Cited

U.S. PATENT DOCUMENTS

| 2011/0169358 | A1 | 7/2011 | Furukawa et al. |
| 2015/0084461 | A1 | 3/2015 | Furukawa et al. |
| 2016/0013697 | A1* | 1/2016 | Haga ........................ H02K 3/28 310/71 |
| 2019/0190356 | A1* | 6/2019 | Nakahara ................. H02K 3/12 |

FOREIGN PATENT DOCUMENTS

| JP | 2010-119157 A | | 5/2010 |
| JP | 2011-167054 A | | 8/2011 |
| JP | 2015-065780 A | | 4/2015 |
| JP | 2016-012995 A | | 1/2016 |
| JP | 2016012995 A | * | 1/2016 |
| JP | 2016-136829 A | | 7/2016 |

OTHER PUBLICATIONS

International Search Report for PCT/JP2016/082585 dated Dec. 6, 2016 (PCT/ISA/210).
Communication dated Oct. 9, 2019 from European Patent Office in counterpart EP Application No. 16920803.0.

* cited by examiner

ROTARY ELECTRIC MACHINE AND MANUFACTURING METHOD THEREFOR

CROSS REFERENCE TO RELATED APPLICATIONS

This application is a National Stage of International Application No. PCT/JP2016/082585 filed Nov. 2, 2016.

TECHNICAL FIELD

The present invention relates to a rotary electric machine such as an electric motor or a generator, etc., and to a manufacturing method therefor, and particularly relates to a stator holding construction of a motor case.

BACKGROUND ART

Conventional motor units such as that described in Patent Literature 1 have had a plurality of components that include: a motor that includes a stator; a motor shaft; a rotor, etc.; a controlling apparatus that controls the motor; a heatsink; and a rotor housing. The conventional motor units have also included a stator housing for accommodating this plurality of components. The stator housing has been configured so as to have a floored cylindrical shape that includes a cylindrical portion and a floor portion that closes an opening at a first end of the cylindrical portion. Flange portions for mounting the motor unit to a vehicle body have also been formed so as to protrude radially outward from the floor portion of the stator housing. The stator, the rotor housing, and the heatsink have each been held by being press-fitted into the cylindrical portion of the stator housing from a second end.

CITATION LIST

Patent Literature

Patent Literature 1: Japanese Patent Laid-Open No. 2016-136829 (Gazette)

SUMMARY OF THE INVENTION

Problem to be Solved by the Invention

In conventional motor units, internally mounted parts including the stator, the rotor housing, and the heatsink, have been held by being press-fitted into the cylindrical portion of the stator housing from the second end.

Now, because strain that arises in the cylindrical portion due to the press-fitting of the internally mounted part acts on the floor portion, horizontalness of the floor portion cannot be ensured if the thickness of the floor portion of the motor housing is reduced. As a result thereof, if the flange portions are fastened to a mounting member on the vehicle body when mounting the motor unit to the vehicle body, then problems arise such as predetermined surface pressure not being ensured.

If the thickness of the floor portion of the motor housing is increased, then the weight of the motor housing increases. The positions of the internally mounted parts also become more distant from an external surface that is a joining surface with the mounting member on the vehicle body, also making the center of gravity of the motor itself more distant from the external surface of the floor portion. As a result thereof, the resonance point drops, giving rise to problems such as vibration and noise being generated during operation.

The present invention aims to solve the above problems and an object of the present invention is to provide a rotary electric machine, and a manufacturing method therefor, that can ensure horizontalness of a floor portion of a case without increasing thickness of the floor portion.

Means for Solving the Problem

A rotary electric machine according to the present invention includes: a floored cylindrical case in which an opening at a first end of a cylindrical portion is closed by a floor portion; a stator that includes: an annular stator core that is held inside the case by being fitted together with and fixed to the cylindrical portion; and coils that are mounted to the stator core; a frame that closes an opening at a second end of the cylindrical portion; a rotating shaft that is rotatably held by the floor portion and the frame, and that is disposed so as to be coaxial to the stator; and a rotor that is fixed to the rotating shaft, and that is disposed on an inner circumferential side of the stator, wherein: a first stress relieving indented portion is formed around an entire circumference at a first end of an inner circumferential surface of the cylindrical portion such that a gap is formed between a first end portion of an outer circumferential surface of the stator core and the cylindrical portion.

Effects of the Invention

According to the present invention, a first stress relieving indented portion is formed around an entire circumference at a first end of an inner circumferential surface of a cylindrical portion such that a gap is formed between a first end portion of an outer circumferential surface of a stator core and the cylindrical portion. Thus, strain that arises in the cylindrical portion when the stator is fitted inside and fixed to a case by press-fitting or shrinkage fitting is released at the first stress relieving indented portion, and does not reach the floor portion. Horizontalness of the floor portion can thereby be ensured without increasing the thickness of the floor portion.

DESCRIPTION OF EMBODIMENTS

Embodiment 1

Figure 1:
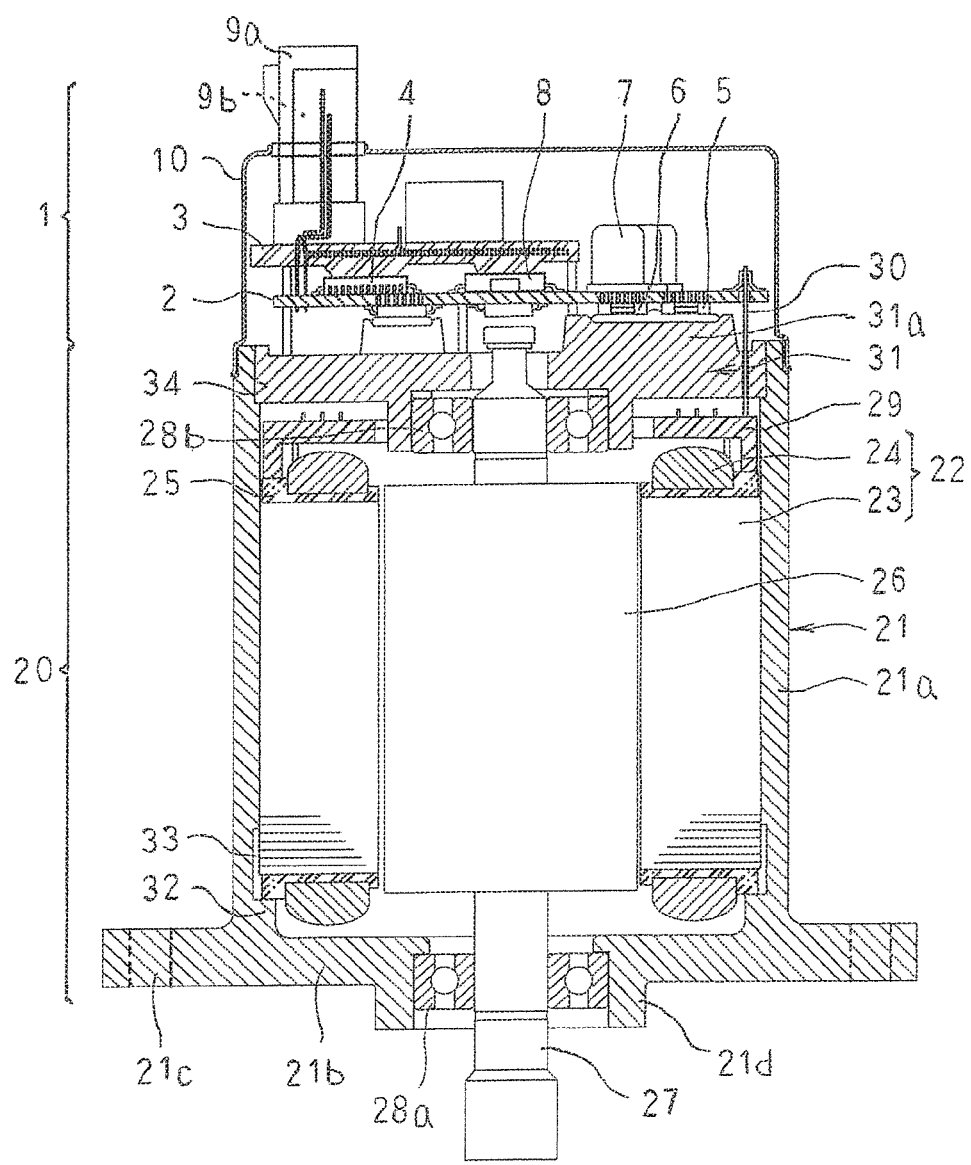
FIG. 1 is a partial cross section that shows a mechanically and electrically integrated module that uses a rotary electric machine according to Embodiment 1 of the present invention.

FIG. 1 is a partial cross section that shows a mechanically and electrically integrated module that uses a rotary electric machine according to Embodiment 1 of the present invention.

In FIG. 1, a mechanically and electrically integrated module includes a control unit 1, and a motor 20 that functions as a rotary electric machine. The control unit 1 is disposed at a first axial end of a rotating shaft 27 of the motor 20, and is configured so as to be integrated with the motor 20. The mechanically and electrically integrated module is disposed such that an axial direction of the rotating shaft of the motor 20 is oriented vertically and such that the control unit 1 is positioned above. In this case, the motor 20 is a polyphase-winding motor that has three phases, but is not limited thereto.

The control unit 1 is configured by stacking a controlling circuit board 2 and an intermediary member 3 vertically within a region that is surrounded by a cover 10 and a frame 31. Electronic components such as switching elements 5 and 6, capacitors 7, and integrated circuits (ICs) 8 that constitute various kinds of circuits such as an inverter circuit that supplies electric current to the motor 20, and a central processing unit (CPU) 4, etc., are mounted onto two surfaces of the controlling circuit board 2. The controlling circuit board 2 is disposed on an upper portion of the frame 31. A heat radiating portion 31a is formed on the frame 31 by making a portion thereof protrude upward. Heat generated by the switching elements 5 and 6, which are disposed on a lower surface of the controlling circuit board 2, can be radiated through the heat radiating portion 31a.

The intermediary member 3 is disposed on an upper portion of the controlling circuit board 2, and connectors 9a and 9b are mounted onto the intermediary member 3.

The cover 10 is produced so as to have a floored cylindrical shape that includes a cylindrical portion and a floor portion using a ferrous metal, for example. The cover 10 is mounted in a state in which an opening end circumscribes an uppermost portion of the cylindrical portion 21a of the motor case 21 by press-fitting or shrinkage fitting, etc. The connectors 9a and 9b protrude upward so as to pass through the floor portion of the cover 10.

Electric power and various types of information are inputted into the control unit 1 by means of the connectors 9a and 9b.

The motor 20 includes: a motor case 21; a stator 22; a rotor 26; and a frame 31 that together with the motor case 21 accommodates the stator 22 and the rotor 26 internally.

The motor case 21 is configured so as to have a floored cylindrical shape that is constituted by: a cylindrical portion 21a that has a cylindrical inner circumferential surface; and a floor portion 21b that closes a lower opening of the cylindrical portion 21a. This motor case 21 is made of a metal, and when consideration is given to heat radiating characteristics and external shape, it is desirable for the motor case 21 to be made of aluminum, for example. A passage aperture that allows passage of the rotating shaft 27 is formed centrally on the floor portion 21b of the motor case 21, and a first bearing 28a is mounted into that passage aperture. A mounting flange portion 21c is also formed integrally so as to protrude radially outward from the floor portion 21b of the motor case 21. A connecting portion 21d that connects with external equipment such as a reduction gear, for example, is further formed integrally so as to protrude downward from the floor portion 21b of the motor case 21 so as to have an outer circumferential surface that functions as a cylindrical surface that is coaxial to an inner circumferential surface of the cylindrical portion 21a.

The stator 22 includes: an annular stator core 23; and coils 24 that are mounted to the stator core 23. The coils 24 are concentrated winding coils that are produced by winding conducting wires around teeth of the stator core 23 and bobbins 25 that are made of an electrically insulating resin that are mounted onto two end surfaces of the teeth. The stator 22 is held inside the motor case 21 by press-fitting the stator core 23 inside the cylindrical portion 21a of the motor case 21.

A disk-shaped metal frame 31 is mounted to the cylindrical portion 21a of the motor case 21 in a state of internal contact by being press-fitted into an uppermost portion of the cylindrical portion 21a. A passage aperture that allows passage of the rotating shaft 27 is also formed centrally on the central portion of the frame 31, and a second bearing 28b is mounted into that passage aperture. In addition, passage apertures that allow passage of the output wires 30 for each of the phases are formed on the frame 31 at three positions. In this manner, the frame 31 serves a plurality of roles such as providing a partitioning wall that separates the motor 20 and the control unit 1, a holding portion for the second bearing 28b, a passage portion for the output wires 30, etc. In addition, the frame 31 also serves a role as a heatsink for radiating heat from the control unit 1.

The rotor 26 is fixed to the rotating shaft 27, which is inserted into a central position, and a plurality of permanent magnet pole pairs (not shown) are disposed on an outer circumferential surface thereof. The rotor 26 is rotatably disposed on an inner circumferential side of the stator 22 so as to be coaxial to the stator 22 by the rotating shaft 27 being supported by the first bearing 28a and the second bearing 28b. An annular connecting ring 29 is produced by insert-molding electrical wiring busbars into an electrically insulating resin, and is disposed on an upper portion of the stator 22 so as to be in close proximity to the coils 24. Coil terminals of the coils 24 are connected to the busbars of the connecting ring 29 to form a three-phase winding that is wye-connected, for example. Output wires 30 for each of the phases that protrude from the connecting ring 29 pass through the frame 31, extend toward the control unit 1, and are connected to the output terminals of the switching elements 5 and 6.

The mechanically and electrically integrated unit that is configured in this manner is mounted to a vehicle body by fitting the connecting portion 21d of the motor case 21 into an interfitting portion of the reduction gear (not shown), and fastening the flange portions 21c of the motor case 21 to a main body of the reduction gear, for example. Electric power is supplied from a battery to the control unit 1 by means of the connector 9a. Information from sensors such as vehicle speed sensors, torque sensors that detect steering torque on a steering wheel, etc., is also inputted into the control unit 1 by means of the connector 9b. In the control unit 1, the CPU 4 computes the electric current that is supplied to the coils 24 based on the inputted information through the connector 9a, and drives an inverter circuit based on those computational results. The switching elements 5 and 6 that correspond to each of the phases are thereby driven, and the electric current is supplied to the coils 24 to drive the motor 20. Furthermore, output from the motor 20 is outputted to the reduction gear from a lower end portion of the rotating shaft 27.

Now, because the stator 22 is press-fitted inside the cylindrical portion 21a of the motor case 21, strain arises in the cylindrical portion 21a of the motor case 21 as a result of the press-fitting of the stator 22. Strain arises in the floor portion 21b, the flange portions 21c, and the connecting portion 21d due to the strain arising in the cylindrical portion 21a. The horizontalness of the floor portion 21b and the flange portions 21c thereby decreases, and verticalness of the connecting portion 21d may also decrease. Moreover, "high horizontalness" means that external surfaces of the floor portion 21b and the flange portions 21c are parallel to a plane that is perpendicular to an axial center of the inner circumferential surface of the cylindrical portion 21a. "High verticalness" means that an outer circumferential surface of the connecting portion 21d is perpendicular to the plane that is perpendicular to the axial center of the inner circumferential surface of the cylindrical portion 21a.

In Embodiment 1, a positioning salient portion 32 is formed around an entire circumference of an inner circumferential surface of the cylindrical portion 21a such that an end portion in a vicinity of the floor portion 21b protrudes radially inward. A first stress relieving indented portion 33 is formed around an entire circumference of the inner circumferential surface of the cylindrical portion 21a such that the inner circumferential surface on an opposite side of the positioning salient portion 32 from the floor portion 21b is indented radially outward. In addition, a positioning indented portion 34 is formed around an entire circumference of the inner circumferential surface of the cylindrical portion 21a such that an opening end portion is indented radially outward. Here, the positioning salient portion 32 extends from the floor portion 21b to the first stress relieving indented portion 33. A bottom surface of the first stress relieving indented portion 33 is formed into a cylindrical surface that is coaxial to the inner circumferential surface of the cylindrical portion 21a. In other words, the first stress relieving indented portion 33 is formed so as to have a groove shape that has a rectangular cross section. A bottom surface of the positioning indented portion 34 is also formed into a cylindrical surface that is coaxial to the inner circumferential surface of the cylindrical portion 21a.

Thus, when press-fitted into the cylindrical portion 21a from the opening, the stator 22 is positioned axially by the bobbins 25 contacting the positioning salient portion 32. Thus, the holding position of the stator 22 inside the motor case 21 is ensured easily and with high precision.

The first stress relieving indented portion 33 is formed around an entire circumference of the inner circumferential surface of the cylindrical portion 21a in a region that faces an end portion of the stator 22 that is nearest to the floor portion 21b. Thus, strain that arises in the cylindrical portion 21a due to press-fitting of the stator 22 is released at the first stress relieving indented portion 33, and is not transmitted to the floor portion 21b, the flange portions 21c, or the connecting portion 21d. Reductions in the horizontalness of the floor portion 21b and the flange portions 21c are thereby suppressed, as well as reductions in the verticalness of the connecting portion 21d. Thus, because the horizontalness of the floor portion 21b and the flange portions 21c can be ensured, when the mechanically and electrically integrated module is mounted to the vehicle body by fastening the flange portions 21c to the main body of the reduction gear, the motor case 21 can be fixed to the main body of the reduction gear using a predetermined surface pressure. Vibration of the mechanically and electrically integrated module and generation of noise can thereby be suppressed during operation of the vehicle body, or when the mechanically and electrically integrated module is operating. Because reductions in the verticalness of the connecting portion 21d are suppressed, the occurrence of shaft misalignment between the interfitting portion of the connecting portion 21d and the reduction gear is suppressed, suppressing declines in output that result from shaft misalignment between the two.

By disposing the first stress relieving indented portion 33, the horizontalness of the floor portion 21b and the flange portions 21c and the verticalness of the connecting portion 21d can be ensured with high precision without increasing the thickness of the thickness of the floor portion 21b. To put it another way, a reduction in the thickness of the floor portion 21b can be achieved. Thus, the positions of the stator 22 and the rotor 26 will not be placed further away from the external surface of the floor portion 21b, which is the joining surface with the main body of the reduction gear. Similarly, the center of gravity of the motor 20 itself will not be placed further away from the external surface of the floor portion 21b. Lowering of the resonance point is thereby suppressed, enabling vibration of the mechanically and electrically integrated module and generation of noise to be suppressed during operation of the vehicle body, or when the mechanically and electrically integrated module is operating.

When press-fitted into the cylindrical portion 21a from the opening, the frame 31 is positioned axially by contacting an end surface of the positioning indented portion 34 that faces in an axial direction. The holding position of the frame 31 inside the motor case 21 is thereby ensured easily and with high precision.

Moreover, in Embodiment 1 above, a stator is fitted together with and fixed to the cylindrical portion by press-fitting the stator into the cylindrical portion, but the stator may be fitted together with and fixed to the cylindrical portion by shrinkage fitting.

In Embodiment 1 above, a frame is fitted together with and fixed to the cylindrical portion by press-fitting the frame into the cylindrical portion, but the frame may be fitted together with and fixed to the cylindrical portion by shrinkage fitting.

In the first stress relieving indented portion, the outer circumferential surfaces of the stator core and the bobbins need only be spaced apart from the inner circumferential surface of the cylindrical portion, and it is not necessary for the first stress relieving indented portion to have a depth as deep as several mm.

In Embodiment 1 above, the positioning salient portion is formed around an entire circumference of the inner circumferential surface of the cylindrical portion, but a positioning salient portion that has a predetermined length in a circumferential direction may be formed at one position on the inner circumferential surface of the cylindrical portion, or a plurality thereof may be formed so as to be distributed circumferentially around the inner circumferential surface of the cylindrical portion.

Embodiment 2

Figure 2:
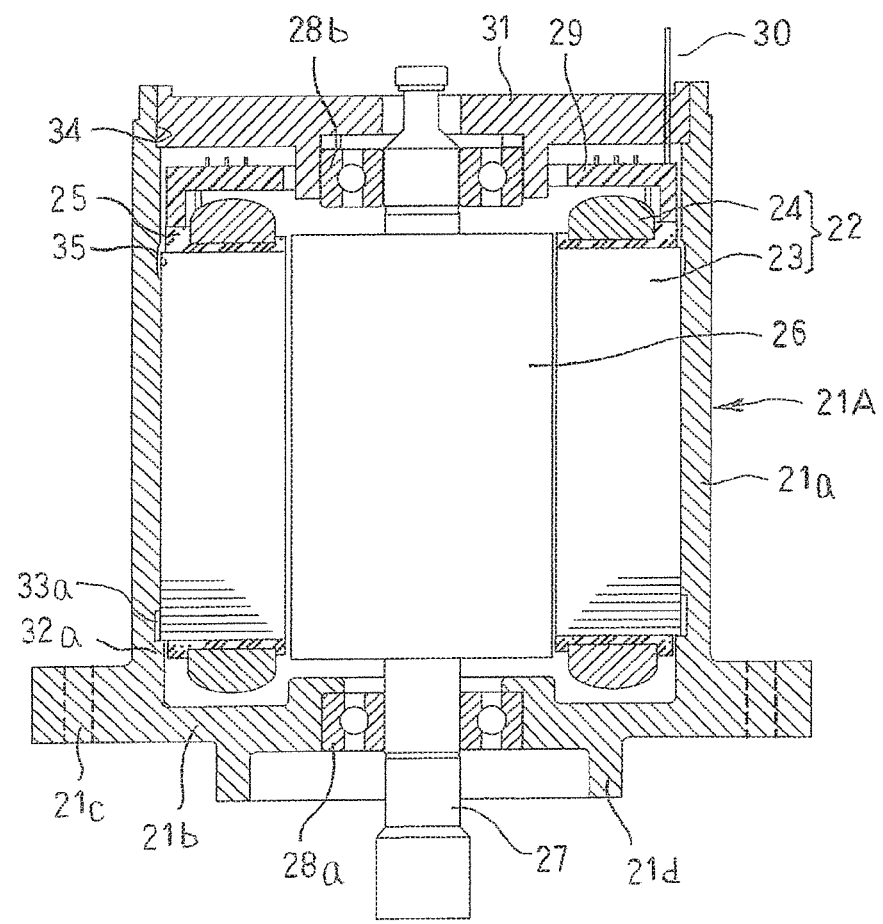
FIG. 2 is a partial cross section that shows a rotary electric machine according to Embodiment 2 of the present invention.

FIG. 2 is a partial cross section that shows a rotary electric machine according to Embodiment 2 of the present invention.

In FIG. 2, a positioning salient portion 32a is formed around an entire circumference of an inner circumferential surface of a cylindrical portion 21a such that an end portion in a vicinity of a floor portion 21b protrudes radially inward. A first stress relieving indented portion 33a is formed around an entire circumference of the inner circumferential surface of the cylindrical portion 21a such that the inner circumferential surface on an opposite side of the positioning salient portion 32a from the floor portion 21b is indented radially outward. A positioning indented portion 34 is formed around an entire circumference of the inner circumferential surface of the cylindrical portion 21a such that an opening end portion is indented radially outward. A second stress relieving indented portion 35 is formed around an entire circumference of the inner circumferential surface of the cylindrical portion 21a such that a region of the inner circumferential surface that faces an opposite end portion of a stator core 23 from the floor portion 21b is indented radially outward. A connecting portion 21d is formed so as to protrude downward from a position on the floor portion 21b that faces radially outer coils 24. Bottom surfaces of the first stress relieving indented portion 33a and the second stress relieving indented portion 35 are formed into cylindrical surfaces that are coaxial to the inner circumferential surface of the cylindrical portion 21a. In other words, the first stress relieving indented portion 33a and the second stress relieving indented portion 35 are formed so as to have groove shapes that have rectangular cross sections.

Moreover, Embodiment 2 is configured in a similar or identical manner to that of Embodiment 1 above except that a motor case 21A that is configured in this manner is used.

In a motor 20A that uses the motor case 21A, a gap is formed by the first stress relieving indented portion 33a between the end portion of the outer circumferential surface of the stator core 23 that is nearest to the floor portion 21b and the inner circumferential surface of the cylindrical portion 21a. Thus, strain that arises in the cylindrical portion 21a due to press-fitting of the stator 22 is released at the first stress relieving indented portion 33a. Consequently, similar or identical effects to those in Embodiment 1 above can also be achieved in Embodiment 2.

According to Embodiment 2, a positioning salient portion 32a is formed so as to position the stator 22 by contacting the end surface of the stator core 23 that is nearest to the floor portion 21b. Thus, the thickness of the floor portion 21b in the region of formation of the positioning salient portion 32a is thicker than in Embodiment 1, increasing the rigidity of the floor portion 21b. Horizontalness of the floor portion 21b and the flange portions 21c can be thereby ensured with high precision. Axial length of the first stress relieving indented portion 33a can also be shortened compared to the first stress relieving indented portion 33 in Embodiment 1.

The second stress relieving indented portion 35 is formed around an entire circumference of the inner circumferential surface of the cylindrical portion 21a such that a region of the inner circumferential surface that faces an opposite end portion of the stator core 23 from the floor portion 21b is indented radially outward. Thus, strain that arises in a vicinity of the opening of the cylindrical portion 21a due to press-fitting of the frame 31 is released at the second stress relieving indented portion 35. The dimensions of the cylindrical portion 21a are thereby ensured in the vicinity of the opening, facilitating mounting of the cover 10.

Moreover, in Embodiment 2 above, a stator and a frame are fitted together with and fixed to the cylindrical portion by press-fitting the stator and the frame into the cylindrical portion, but the stator and the frame may be fitted together with and fixed to the cylindrical portion by shrinkage fitting.

Embodiment 3

Figure 3:
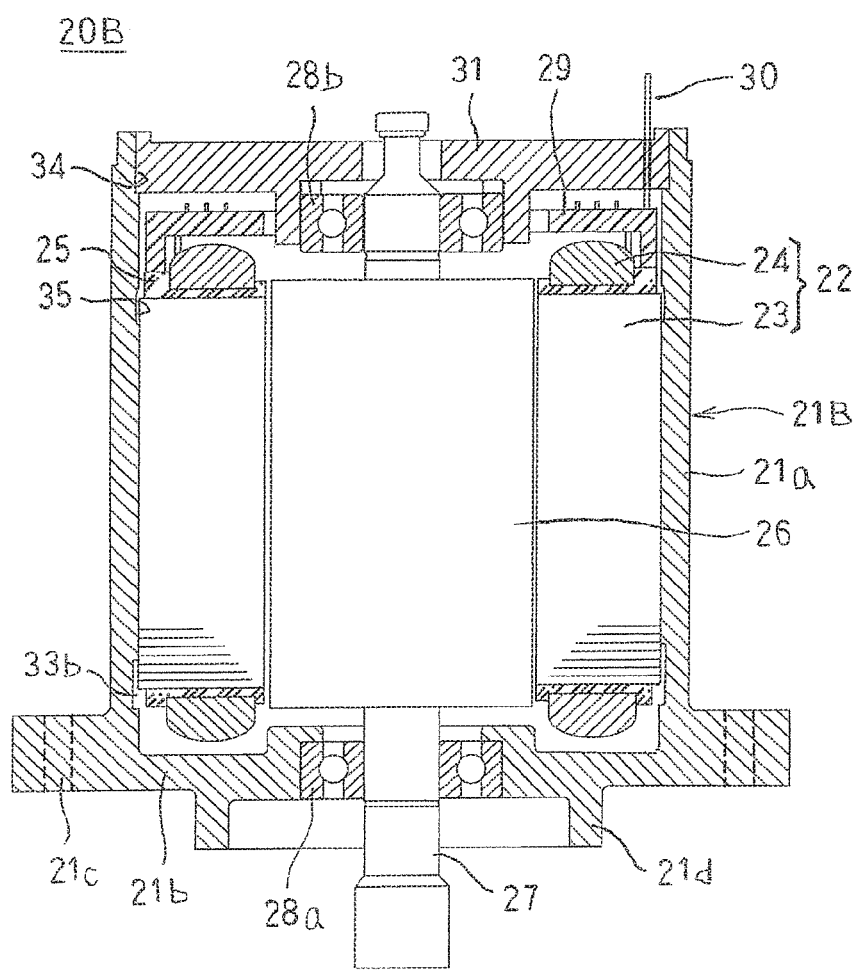
FIG. 3 is a partial cross section that shows a rotary electric machine according to Embodiment 3 of the present invention.

FIG. 3 is a partial cross section that shows a rotary electric machine according to Embodiment 3 of the present invention.

In FIG. 3, a first stress relieving indented portion 33b is formed around an entire circumference of an inner circumferential surface of a cylindrical portion 21a such that an end portion in a vicinity of a floor portion 21b is indented radially outward. A positioning indented portion 34 is formed around an entire circumference of the inner circumferential surface of the cylindrical portion 21a such that an opening end portion is indented radially outward. A second stress relieving indented portion 35 is formed around an entire circumference of the inner circumferential surface of the cylindrical portion 21a such that a region of the inner circumferential surface that faces an opposite end portion of a stator core 23 from the floor portion 21b is indented radially outward. A connecting portion 21d is formed so as to protrude downward from a position on the floor portion 21b that faces radially outer coils 24. A bottom surface of the first stress relieving indented portion 34a is formed into a cylindrical surface that is coaxial to the inner circumferential surface of the cylindrical portion 21a. In other words, the first stress relieving indented portion 34a is formed so as to have a groove shape that has a rectangular cross section.

Moreover, Embodiment 3 is configured in a similar or identical manner to that of Embodiment 2 above except that a motor case 21B that is configured in this manner is used.

In a motor 20B that uses the motor case 21B, a gap is formed by the first stress relieving indented portion 33b between the end portion of the outer circumferential surface of the stator core 23 that is nearest to the floor portion 21b and the inner circumferential surface of the cylindrical portion 21a. A gap is also formed by the second stress relieving indented portion 35 between the end portion of the outer circumferential surface of the stator core 23 at the opposite end from the floor portion 21b and the inner circumferential surface of the cylindrical portion 21a. Thus, strain that arises in the cylindrical portion 21a due to press-fitting of the stator 22 is released at the first stress relieving indented portion 33a. In addition, strain that arises in a vicinity of the opening of the cylindrical portion 21a due to press-fitting of the frame 31 is released at the second stress relieving indented portion 35. Consequently, similar or identical effects to those in Embodiment 2 above can also be achieved in Embodiment 3.

In Embodiment 3, a positioning salient portion is omitted, but the interfitting position of the stator 22 can be ensured by controlling how much of the stator 22 is inserted into the cylindrical portion 21a when the stator 22 is being press-fitted into the cylindrical portion 21a from the vicinity of the opening.

Moreover, extending the first stress relieving indented portion 33b as far as the floor portion 21b gives rise to reductions in the rigidity of the floor portion 21b, leading to reductions in the horizontalness of the external surfaces of the floor portion 21b. Thus, it is preferable to keep formation of the first stress relieving indented portion 33b within the inner circumferential surface of the cylindrical portion 21a.

In Embodiment 3 above, the stator and the frame are fitted together with and fixed to the cylindrical portion by press-fitting the stator and the frame into the cylindrical portion, but the stator and the frame may alternatively be fitted together with and fixed to the cylindrical portion by shrinkage fitting.

Figure 4:
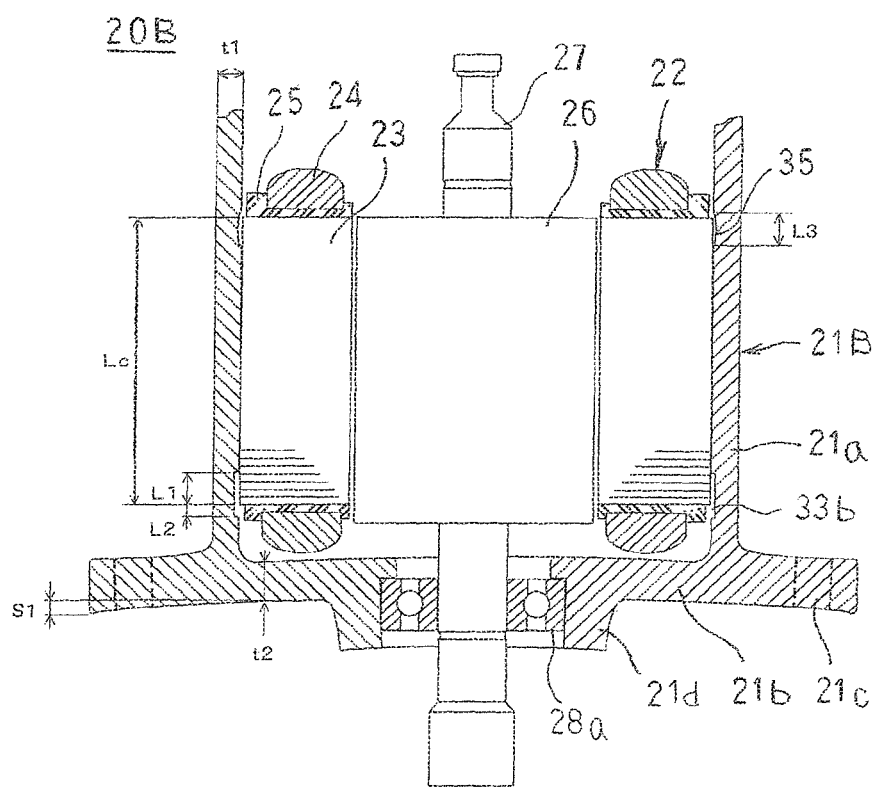
FIG. 4 is a partial cross section that shows a deformation mode of a floor portion of a motor case in the rotary electric machine according to the present invention.
Figure 5:
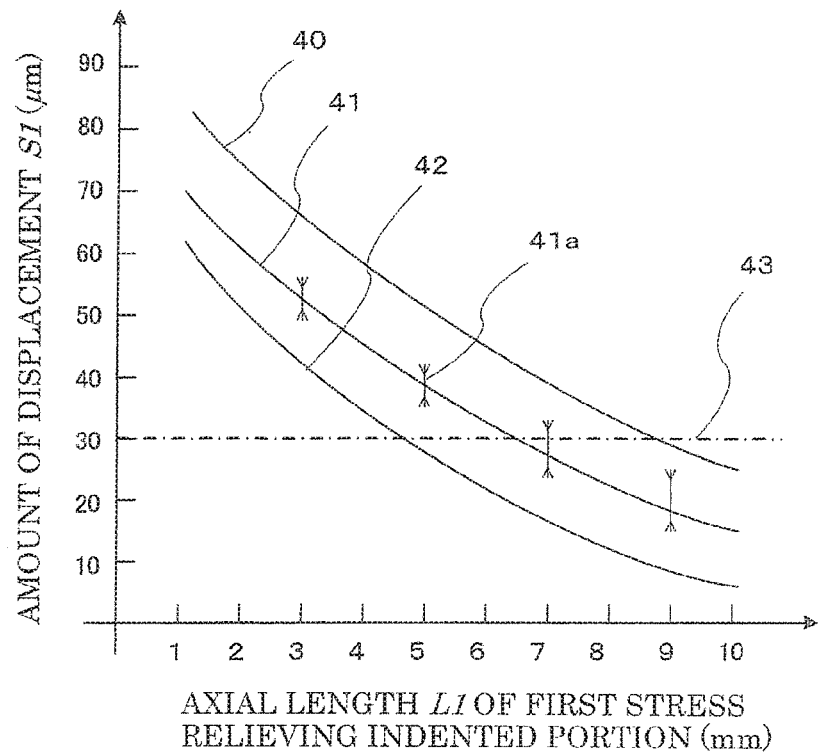
FIG. 5 is a graph that shows a relationship between an amount of displacement of flange portions of a motor case and an axial length of a first stress relieving indented portion in the rotary electric machine according to the present invention using interference as a parameter.
Figure 6:
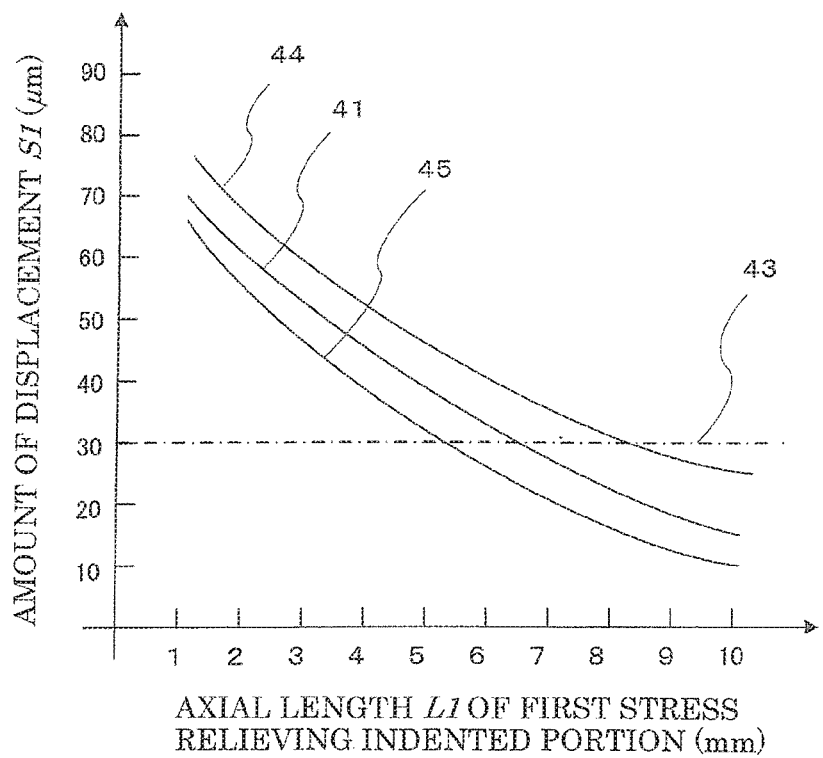
FIG. 6 is a graph that shows a relationship between an amount of displacement of flange portions of a motor case and an axial length of a first stress relieving indented portion in the rotary electric machine according to the present invention using a thickness of the floor portion as a parameter.

Axial length of the first stress relieving indented portion will now be investigated using FIGS. 4 through 6. FIG. 4 is a partial cross section that shows a deformation mode of a floor portion of a motor case in the rotary electric machine according to the present invention, FIG. 5 is a graph that shows a relationship between an amount of displacement of flange portions of a motor case and an axial length of a first stress relieving indented portion in the rotary electric machine according to the present invention using interference as a parameter, and FIG. 6 is a graph that shows a relationship between an amount of displacement of flange portions of a motor case and an axial length of a first stress relieving indented portion in the rotary electric machine according to the present invention using a thickness of the floor portion as a parameter.

In FIG. 4, t1 is a thickness of the cylindrical portion 21a, t2 is a thickness of the floor portion 21b, Lc is an axial length of the stator core 23, L1 is an axial length of the first stress relieving indented portion 33b that overlaps with the stator core 23 in the axial direction, L2 is an axial length of an extended portion of the first stress relieving indented portion 33b that extends toward the floor portion 21b from an end portion of the stator core 23, L3 is an axial length of the second stress relieving indented portion 35, and S1 is an amount of displacement of the flange portions 21c.

If the stator 22 is fitted together with and fixed to the cylindrical portion 21a by press-fitting or shrinkage-fitting, then strain arises in the cylindrical portion 21a, warping the floor portion 21b. As shown in FIG. 4, the floor portion 21b is bent upward thereby, and the flange portions 21c are bent downward, reducing the horizontalness of the floor portion 21b and the flange portions 21c. At that point, the outer circumferential surface of the connecting portion 21d is no longer perpendicular to the plane that is perpendicular to the axial center of the cylindrical portion 21a. In other words, the verticalness of the outer circumferential surface of the connecting portion 21d is reduced, and the cross section of the outer circumferential surface of the connecting portion 21d perpendicular to the axial center of the cylindrical portion 21a is distorted from a circular shape into an elliptical shape.

The amount of displacement S1 of the flange portions 21c varies depending on the dimensions, the interference, and the materials of the respective portions of the motor case 21B. However, as a result of experimental manufacture and simulation, it has been possible to confirm that changes in the amount of displacement S1 are reduced even if the axial length Lc of the stator core 23 is changed, and also that changes in the amount of displacement S1 are reduced even if the diameter of the stator core 23 is changed, when the motor case 21B is made of aluminum and the stator core 23 is made of steel sheets. Specifically, it was found that the main factor that affects the amount of displacement S1 is interference. To put it another way, it was found that interference has the greatest effect on strain in the floor portion 21b, the flange portions 21c, and the connecting portion 21d. It was also found that strain in the flange portions 21c is affected more by interference than is strain in the floor portion 21b and the connecting portion 21d. Moreover, when the stator 22 is fitted together with and fixed to the motor case 21B by press-fitting or shrink-fitting, interference is the dimensional difference between the outside diameter of the stator core 23 and the inside diameter of the cylindrical portion 21a before being fitted together.

Now, a relationship between the axial length L1 of the first stress relieving indented portion 33b and the amount of displacement S1 was measured while changing the interference, the results being shown in FIG. 5. In FIG. 5, curve 40 is a case in which the interference is 300 μm, curve 41 is a case in which the interference is 200 μm, and curve 42 is a case in which the interference is 150 μm. A dotted chain line 43 is the maximum allowable value (30 μm) of the amount of displacement S1. Moreover, the thickness t1 of the cylindrical portion 21a was 4 mm, and the thickness t2 of the floor portion 21b was 6 mm.

From FIG. 5, it can be seen that when the interference is 300 μm (curve 40), the axial length L1 of the first stress relieving indented portion 33b must be greater than or equal to 9 mm to keep the amount of displacement S1 less than or equal to the maximum allowable value. It can also be seen that when the interference is 200 μm (curve 41), the axial length L1 of the first stress relieving indented portion 33b must be greater than or equal to 6.5 mm to keep the amount of displacement S1 less than or equal to the maximum allowable value. It can also be seen that when the interference is 150 μm (curve 42), the axial length L1 of the first stress relieving indented portion 33b must be greater than or equal to 5 mm to keep the amount of displacement S1 less than or equal to the maximum allowable value.

In FIG. 5, candlestick charts 41a indicate dispersion when the interference was 200 μm and the thickness t1 of the cylindrical portion 21a was varied from 3 mm through 6 mm. From the candlestick charts 41a, it can be seen that there is no significant effect on the relationship between the axial length L1 of the first stress relieving indented portion 33b and the amount of displacement S1 within the range in which the thickness t1 of the cylindrical portion 21a is 3 mm through 6 mm.

Next, the relationship between the axial length L1 of the first stress relieving indented portion 33b and the amount of displacement S1 was measured while changing the thickness t2 of the floor portion 21b, the results being shown in FIG. 6. In FIG. 6, curve 41 is a case in which the thickness t1 of the floor portion 21b was 6 mm, curve 44 is a case in which the thickness t1 of the floor portion 21b was 8 mm, and curve 45 is a case in which the thickness t1 of the floor portion 21b was 4 mm. The dotted chain line 43 is the maximum allowable value (30 μm) of the amount of displacement S1. Moreover, the interference was 200 μm, and the thickness t1 of the cylindrical portion 21a was 4 mm.

For the body dimensions of the motor 20B that is shown in FIG. 4, if the thickness t2 of the floor portion 21b is less than or equal to 3 mm, it is not possible to ensure the strength of the motor case 21B itself, much less ensure the horizontalness of the floor portion 21b. It is thereby essential to make the thickness t2 of the floor portion 21b greater than 3 mm. Because flexure when a predetermined force is applied to the floor portion 21b is inversely proportional to the third power of the thickness, the strength of the floor portion 21b, etc., changes significantly if the thickness is changed by even 1 mm.

When FIG. 5 and FIG. 6 are compared, it can be seen that changing the interference changes the amount of displacement S1 more significantly than changing the thickness of the floor portion 21b. Here, the axial length L1 of the first stress relieving indented portion 33b and the thickness t2 of the floor portion 21b can be set from FIGS. 5 and 6 if the maximum allowable value of the amount of displacement S1 is set to 30 μm and the interference is fixed at a certain value.

Furthermore, because the axial length L2 of the extended portion of the first stress relieving indented portion 33b affects the amount of displacement S1 only negligibly, it may be set to zero, or may be determined as required by the relationships between the coils 24 and the bobbins 25.

The frame 31 is fitted together with and fixed to the cylindrical portion 21a on a side near the opening portion by press-fitting or shrinkage fitting. Thus, when strain that arises in the cylindrical portion 21 due to this fitting together and fixing reaches the open end portion of the cylindrical portion 21a, the open end portion of the cylindrical portion 21a displaces, and the roundness thereof decreases. Because other members, such as the cover 10, for example, are also fitted together with and fixed to the open end portion of the cylindrical portion 21a, it is necessary to keep the amount of displacement of the open end portion of the cylindrical portion 21a to less than or equal to a predetermined value. Thus, because there are no portions that protrude radially outward on the open end portion of the cylindrical portion 21a, the axial length L1 of the first stress relieving indented portion 33b, which is determined such that the amount of displacement S1 is less than or equal to the maximum allowable value (30 μm) using FIGS. 5 and 6, can be set as the axial length L3 of the second stress relieving indented portion 35. Consequently, if the axial length L3 of the second stress relieving indented portion 35 is set so as to be approximately equal to the axial length L1 of the first stress relieving indented portion 33b, the amount of displacement of the open end portion of the cylindrical portion 21a can be made smaller than the amount of displacement of the floor portion 21b and the flange portions 21c.

Here, a method for determining the interference, the thickness t2 of the floor portion, the axial length L3 of the first stress relieving indented portion 33b, and the axial length L1 of the second stress relieving indented portion 35 using the motor case 21B has been explained, but it goes without saying that the interference, the thickness t2 of the floor portion, the axial length L3 of the first stress relieving indented portion 33b, and the axial length L1 of the second stress relieving indented portion 35 can also be determined by a similar method in the motor cases 21 and 21A in Embodiments 1 and 2.

In the above manner, when manufacturing a rotary electric machine, the maximum allowable value of the amount of displacement S1 of the flange portions is first determined, and the relationship between the axial length of the first stress relieving indented portion and the amount of displacement S1 of the flange portions is measured using interference, which is the dimensional difference between the inside diameter of the cylindrical portion of the motor case and the outside diameter of the stator core, as a parameter, and the interference and the axial length of the first stress relieving indented portion can be determined from the results of that measurement and the maximum allowable value of the amount of displacement S1 of the flange portions. The relationship between the axial length of the first stress relieving indented portion and the amount of displacement S1 of the flange portions is also measured using the thickness of the floor portion as a parameter, with the determined interference and axial length of the first stress relieving indented portion fixed, and the thickness of the floor portion can be determined from the results of that measurement and the maximum allowable value of the amount of displacement S1 of the flange portions.

Thus, if the rotary electric machine is manufactured based on the determined interference, axial length of the first stress relieving indented portion, and thickness of the floor portion, the amount of displacement of the floor portion, the flange portions, the connecting portion, and the open end portion of the cylindrical portion of the motor case can be kept less than or equal to the maximum allowable value. The thickness of the floor portion can thereby be set to an appropriate thickness, enabling the required dimensions for mounting to other members and fitting together with other members to be satisfied. Fittings for the stator, the rotor, etc., can also be disposed in a vicinity of the floor portion inside the motor case. The center of gravity of the rotary electric machine can thereby be placed in proximity to the mounting portions, suppressing the generation of vibration and noise, and enabling robust mounting.

Moreover, in each of the above embodiments, an inner-rotor motor has been explained, but similar or identical effects can also be achieved if the present invention is applied to rotary electric machines such as inner-rotor generators and generator-motors.

In each of the above embodiments, a stator and a frame are held in the cylindrical portion of a motor case by press-fitting, but the stator and the frame may be held in the cylindrical portion of the motor case by shrinkage fitting.

In each of the above embodiments, first and second stress relieving indented portions are formed so as to have groove shapes that have rectangular cross sections, but the groove shapes of the first and second stress relieving indented portions are not limited to having rectangular cross sections, gaps need only be formed between the cylindrical portion and the stator in the first and second stress relieving indented portions, and the cross-sectional shapes of the bottom surfaces of the indented portions in a plane that includes the axial center of the rotating shaft may be arc-shaped cross sections that have a circular arc, for example.

EXPLANATION OF NUMBERING 20, 20A, 20B MOTOR (ROTARY ELECTRIC MACHINE); 21, 21A, 21B MOTOR CASE; 21a CYLINDRICAL PORTION; 21b FLOOR PORTION; 21c FLANGE PORTION; 22 STATOR; 23 STATOR CORE; 24 COIL; 25 BOBBIN; 26 ROTOR; 27 ROTATING SHAFT; 31 FRAME; 32, 32a POSITIONING SALIENT PORTION; 33, 33a, 33b FIRST STRESS RELIEVING INDENTED PORTION; 35 SECOND STRESS RELIEVING INDENTED PORTION.

The invention claimed is:

1. A rotary electric machine comprising:
a floored cylindrical case in which an opening at a first end of a cylindrical portion is closed by a floor portion;
a stator that comprises:
an annular stator core that is held inside said case by being fitted together with and fixed to said cylindrical portion; and
coils that are mounted to said stator core;
a frame that closes an opening at a second end of said cylindrical portion;
a rotating shaft that is rotatably held by said floor portion and said frame, and that is disposed so as to be coaxial to said stator; and
a rotor that is fixed to said rotating shaft, and that is disposed on an inner circumferential side of said stator, wherein:
a first stress relieving indented portion, forming a groove on an inner circumferential surface of said cylindrical portion, is formed above said floor portion and around an entire circumference at a first end of said inner circumferential surface of said cylindrical portion such that a gap is formed between a first end portion of an outer circumferential surface of said stator core and said the first stress relieving indented portion, and a thickness of a portion of the cylindrical portion including the first stress relieving indented portion is thinner than a thickness of remaining portion of the cylindrical portion.

2. The rotary electric machine according to claim 1, wherein a flange portion for mounting is formed so as to protrude radially outward from said floor portion.

3. The rotary electric machine according to claim 2, wherein:
said frame is fitted together with and fixed to an opening end portion at said second end of said cylindrical portion; and
a second stress relieving indented portion is formed around an entire circumference at a second end of an inner circumferential surface of said cylindrical portion such that a gap is formed between a second end portion of an outer circumferential surface of said stator core and said cylindrical portion.

4. The rotary electric machine according to claim 3, wherein:
a positioning salient portion is formed so as to protrude radially inward from an inner circumferential surface of said cylindrical portion so as to extend from said floor portion toward said second end, said positioning salient portion contacting an outer circumferential edge portion of a first end surface of said stator core.

5. The rotary electric machine according to claim 3, wherein:
said coils are mounted to said stator core so as to have bobbins interposed that are disposed on two end surfaces of said stator core; and
a positioning salient portion is formed so as to protrude radially inward from an inner circumferential surface of said cylindrical portion so as to extend from said floor portion toward said second end, said positioning salient portion contacting a surface of said bobbins that are disposed on a first end surface of said stator core that faces toward said first end.

6. The rotary electric machine according to claim 2, wherein:
a positioning salient portion is formed so as to protrude radially inward from an inner circumferential surface of said cylindrical portion so as to extend from said floor portion toward said second end, said positioning salient portion contacting an outer circumferential edge portion of a first end surface of said stator core.

7. The rotary electric machine according to claim 2, wherein:
said coils are mounted to said stator core so as to have bobbins interposed that are disposed on two end surfaces of said stator core; and
a positioning salient portion is formed so as to protrude radially inward from an inner circumferential surface of said cylindrical portion so as to extend from said floor portion toward said second end, said positioning salient portion contacting a surface of said bobbins that are disposed on a first end surface of said stator core that faces toward said first end.

8. A manufacturing method for a rotary electric machine, being design and manufacturing of the rotary electric machine according to claim 2, wherein:
a first relationship between an axial length of said first stress relieving indented portion and an amount of displacement of said flange portion is measured using interference between said cylindrical portion and said stator core as a parameter;
said interference and said axial length of said first stress relieving indented portion are determined from results of said measurement of said first relationship such that said amount of displacement of said flange portion becomes less than or equal to a maximum allowable value;
a second relationship between said axial length of said first stress relieving indented portion and said amount of displacement of said flange portion is also measured using said interference and said axial length of said first stress relieving indented portion as determined values and using a thickness of said floor portion as a parameter; and
said thickness of said floor portion is determined from results of said measurement of said second relationship such that said amount of displacement of said flange portion becomes less than or equal to said maximum allowable value.

9. The rotary electric machine according to claim 1, wherein:
said frame is fitted together with and fixed to an opening end portion at said second end of said cylindrical portion; and
a second stress relieving indented portion forming a groove on said inner circumferential surface of said cylindrical portion is formed around an entire circumference at a second end of an inner circumferential surface of said cylindrical portion such that a gap is formed between a second end portion of an outer circumferential surface of said stator core and said second stress relieving indented portion.

10. The rotary electric machine according to claim 9, wherein:
a positioning salient portion is formed so as to protrude radially inward from an inner circumferential surface of said cylindrical portion so as to extend from said floor portion toward said second end, said positioning salient portion contacting an outer circumferential edge portion of a first end surface of said stator core.

11. The rotary electric machine according to claim 9, wherein:
said coils are mounted to said stator core so as to have bobbins interposed that are disposed on two end surfaces of said stator core; and
a positioning salient portion is formed so as to protrude radially inward from an inner circumferential surface of said cylindrical portion so as to extend from said floor portion toward said second end, said positioning salient portion contacting a surface of said bobbins that are disposed on a first end surface of said stator core that faces toward said first end.

12. The rotary electric machine according to claim 1, wherein:
a positioning salient portion is formed so as to protrude radially inward from an inner circumferential surface of said cylindrical portion so as to extend from said floor portion toward said second end, said positioning salient portion contacting an outer circumferential edge portion of a first end surface of said stator core.

13. The rotary electric machine according to claim 1, wherein:
said coils are mounted to said stator core so as to have bobbins interposed that are disposed on two end surfaces of said stator core; and a positioning salient portion is formed so as to protrude radially inward from an inner circumferential surface of said cylindrical portion so as to extend from said floor portion toward said second end, said positioning salient portion contacting a surface of said bobbins that are disposed on a first end surface of said stator core that faces toward said first end.

\* \* \* \* \*